Sept. 17, 1935.　　　C. R. ROCHE　　　2,014,670
AUTOMOBILE CONSTRUCTION
Filed March 16, 1934　　　2 Sheets-Sheet 1
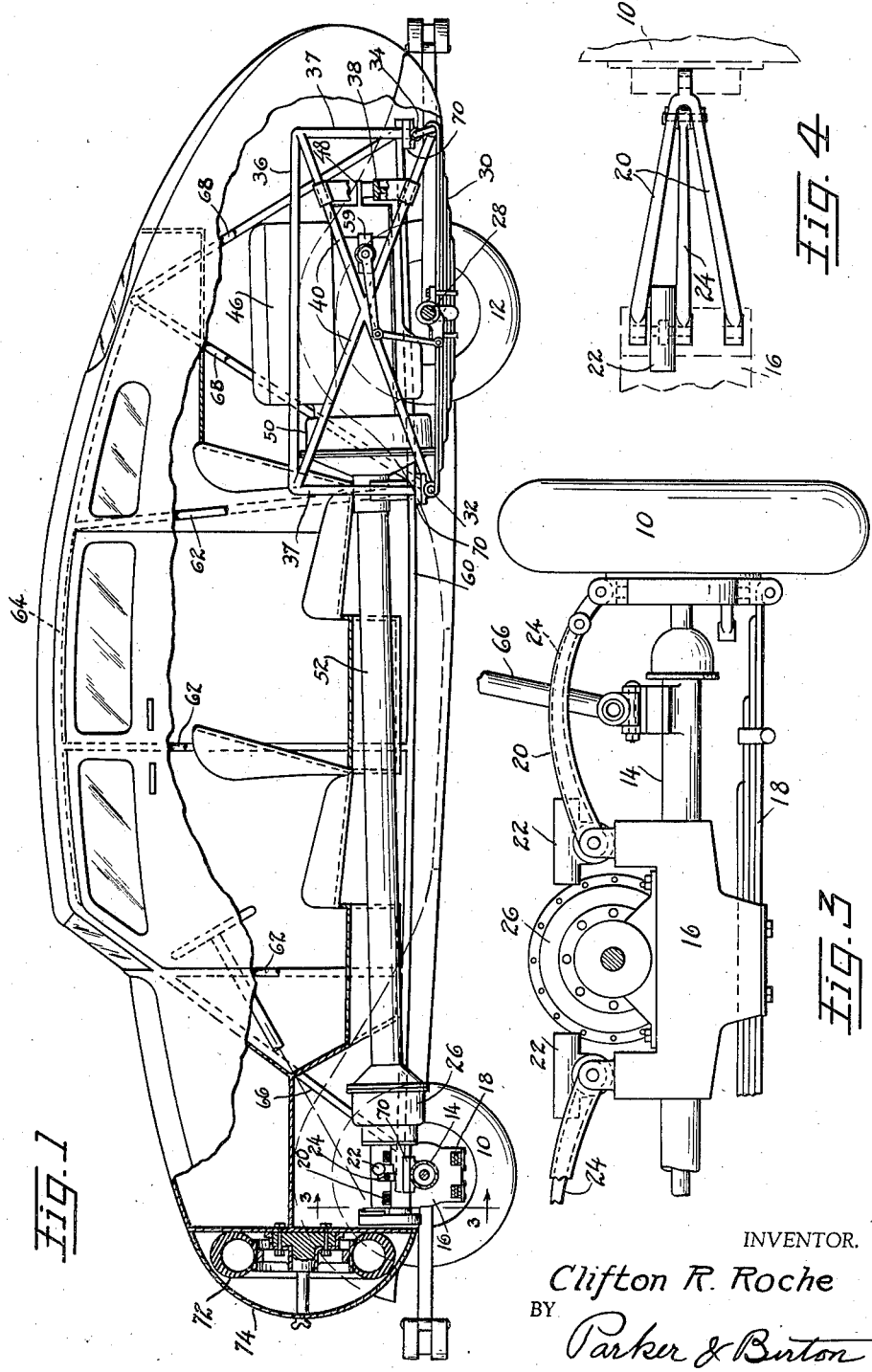
INVENTOR.
Clifton R. Roche
BY
Parker & Burton
ATTORNEYS.

Sept. 17, 1935.   C. R. ROCHE   2,014,670
AUTOMOBILE CONSTRUCTION
Filed March 16, 1934   2 Sheets-Sheet 2
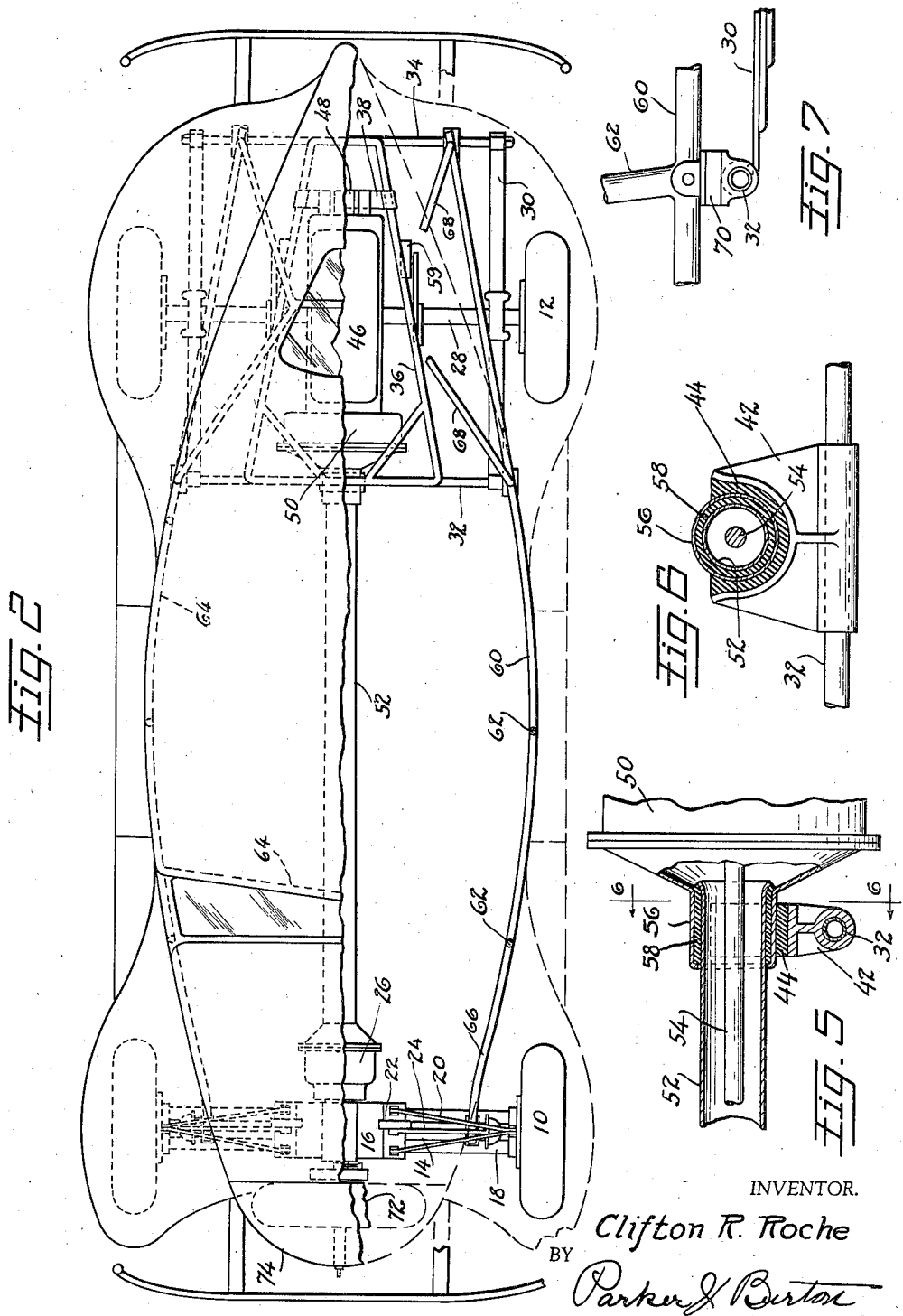
INVENTOR.
Clifton R. Roche
BY
Parker & Burton
ATTORNEYS.

Patented Sept. 17, 1935

2,014,670

UNITED STATES PATENT OFFICE 2,014,670

AUTOMOBILE CONSTRUCTION

Clifton R. Roche, Detroit, Mich.

Application March 16, 1934, Serial No. 715,903

19 Claims. (Cl. 180—54)

My invention relates to improvements in motor vehicle construction and assembly.

An object of my invention is to provide a motor vehicle having improved distribution of weight and having its engine and transmission mechanism so relatively arranged and supported and the body so mounted as to substantially eliminate the vibration and shock normally imparted to the body by the running of the engine and the travel of the vehicle.

In my improved vehicle the center of gravity is low and the weight is distributed fore and aft and the passenger carrying compartment of the body is located between the distributed fore and aft weights. The body is supported in an improved manner upon a cushion support. The engine is so mounted upon an improved cushion support and is so connected with the drive mechanism or transmission assembly that the torque reactions and vibrations set up by running of the engine and travel of the vehicle are not appreciably transmitted to the body.

The construction and assembly is such as to make for successful streamlining of the body. The body is so supported and the passenger carrying compartment thereof so suitably disposed that the maximum of riding ease and comfort is obtained. In the distribution of the weight I prefer to support the weight of the engine upon one pair of wheels and the weight of the transmission, which may include the change speed gearing and the transverse driving mechanism, upon the other pair of wheels. As here shown the engine is located at the rear and the transmission mechanism at the front. The reverse arrangement might however be employed. The successful streamlining of the body is facilitated by this construction and I further favor this result by placing the spare tire in the nose of the vehicle completely enclosed with its cover forming a portion of the streamlined body.

A feature of primary importance is the provision of a rigid structural connection between the engine at one end and the transmission mechanism at the other end which unites these two elements into a rigid structural assembly and eliminates the conventional commercial frame. The propeller shaft may extend through this structural connection and be enclosed thereby. This structural assembly acts to take the torque reaction of the motor and also the torque reaction of the driving mechanism without transmitting the same in vibrations to the body.

Another feature of primary importance is the mounting of the power unit with respect to the wheels and the body of the vehicle. Of significance is the provision of an engine supporting frame which is spring supported, or otherwise resiliently supported, upon one pair of wheels. Carried within this frame are cushion supports upon which the engine is rockably mounted. The engine is here shown as supported for rockable movement about an axis which coincides substantially with the centerline of the vehicle. Torsional vibrations of the engine are taken by the rigid structural connection which extends to the transmission casing and the torque reactions of the transverse driving mechanism are likewise taken by the same rigid connection in its extension to the engine. The structural connection forms a lengthy power arm transmitting such forces and is, as will be seen, of such a length that a very small amount of these forces are transmitted, and the floating mounting of the engine supporting frame is such that these forces are substantially prevented from being imparted to the body of the vehicle.

Suitable shock absorber mechanism is provided which is auxiliary to the suspension and cushioning means heretofore described and which serves to reduce and damp out the vibrations and shocks created by the travel of the vehicle. This shock absorbing mechanism cooperates to reduce and minimize the vibrations in such a manner that the body receives a very little thereof. Moreover, there is no direct connection between the shock absorbing mechanism and the body and the latter is cushioned in such an improved manner that the reactions of the shock absorbing mechanism itself is not imparted to the body.

The body is provided with a complete cushion support upon the engine frame at the rear end of the vehicle and upon parts associated with the transmission casing at the opposite end to the vehicle. The body illustrated is of the rigid truss type and its mounting preserves it from receiving the small amount of vibration which might otherwise reach it, the major portion having been damped out by the construction hereinabove generally described.

Various other important features and meritorious characteristics of my invention will more fully appear from the following description, appended claims, and accompanying drawings, wherein:

Figure 1 is a side elevation of an automobile body embodying my invention,

Fig. 2 is a plain of the vehicle shown in elevation in Fig. 1.

Fig. 3 is a fragmentary sectional view taken on line 3—3 of Fig. 1 of the front end, Fig. 4 is a plan of the torque arms and shock absorber connection at one front wheel, Fig. 5 is a sectional view through the structural connection between the engine and the transmission casing adjacent to the fly wheel housing, Fig. 6 is a sectional view taken on line 6—6 of Fig. 5, and Fig. 7 is a fragmentary detail showing the connection of the body frame with its support.

In Figs. 1 and 2 I show a motor vehicle embodying my invention having a pair of front supporting wheels 10 and a pair of rear road wheels 12. The front wheels are mounted on swinging half axles, the axle tubes of which are indicated as 14. Transmission mechanism driven by the engine is supported within a casing 16 which is carried upon transverse springs 18. In the construction shown the front wheels are the driving wheels. The driving axles, not shown, extend through the axle tubes to the transmission mechanism within the housing 16. A pair of torque arms 20 extend from a shackled connection at each wheel to spaced apart pivotal supports upon the casing 16 as shown particularly in Figs. 3 and 4. A shock absorber 22 is mounted upon each side of the casing 16 and has an operating arm 24 extending to the wheel between the torque arms 20. This construction is shown in detail in Fig. 4. In addition to the transverse driving mechanism mounted within the housing 16 the change speed mechanism may be disposed within the adjacent housing 26.

The rear wheels 12 are mounted upon an axle 28 which carries two longitudinally extending springs 30, the front ends of which are connected by a cross member 32 and the rear ends of which are connected by a cross member 34. These cross members together with longitudinal frame members 37, vertical members 37, cross members 38 for supporting the rear end of the engine, and brace elements 40 constitute an engine supporting frame. This engine supporting frame in the embodiment illustrated herein constitutes a cage-like structure, but it is obvious that other types of frames may be employed to accomplish the same purpose.

The engine 46 is pivotally supported within its supporting frame at front and rear for rockable movement upon cushion supports about a longitudinal axis. One of these supports is shown in Fig. 6. The cross piece 32 is shown as provided with a bracket 42 which has a cradle portion carrying a suitable cushion element 44 which may be formed of rubber or the like. The forward end of the engine casing terminates in the fly wheel housing 50 which is rigidly connected therewith and in turn firmly connected with the transmission casing 26 by a tubular structural member 52.

In Fig. 5 I have shown the front end of the fly wheel housing as having a tubular extension 56 spaced from the tubular member 52 by a rubber cushion 58. This cushion connection 58 assists in the absorption of torque and torsion vibrations transmitted along the structural member 52. The extension 56 is shown as mounted upon the cushion element 44 to support the forward end of the engine. The rear end of the engine is similarly supported upon a similar cushion support carried by the cross piece 38. The engine 46 at the rear end has a lug 48 which seats thereon. It is thus seen that the engine has a two point resilient suspension within its spring supported frame. With reference to the vehicle as a whole, the engine supporting frame structure forms a unitary, independent sub-frame within the vehicle. It is resiliently mounted with respect to the wheels and the engine and as will be later noted to the body of the vehicle.

This connection of the engine at one end of the vehicle with the transmission mechanism at the opposite end of the vehicle by a torque taking and rigid structural element forms a primary feature of my invention. This tubular member 52 might be formed in any desired fashion to serve the purpose of providing a rigid independent structural assembly at one end of which the engine is mounted and at the opposite end of which the transmission mechanism is mounted. A preferred form is the tubular type here shown which permits the extension of the propeller shaft 54 therethrough.

It will now be seen that through this method of distribution of the parts I have distributed the weight so that the weight of the engine is carried on the two rear wheels and the weight of the transmission mechanism which here includes the differential and the change speed gearing is carried on the two front wheels. To increase the weight at the forward end of the vehicle the gasoline tank may be located there and also the spare tire. The location of the spare tire is described hereinafter in connection with the description of the body.

Due to this method of mounting the engine the torsional forces are taken by the rigid structural connection 52 which extends to the transmission casing 26 and the torque reaction produced by the driving mechanism is likewise taken by this structural member. Due to the length of such member a very small amount of these forces will be transmitted to the opposite end of the vehicle and the torque reaction force created at the transmission mechanism will be damped out by the cushion mounting of the engine.

The reaction from the transverse drive mechanism produced at the engine mounting is equal to the torque of the live axle divided by the lever arm length which in this instance consists mainly of the structural connecting member 52. It is readily seen that the long length of the latter member greatly reduces the reactionary forces produced by the power unit.

The tubular structure connecting the separated engine and transmission together affords what might be termed a backbone for the vehicle and will permit the assembly of the engine, transmission mechanism, wheels and axles, so that in the assembly operation my rigid type of body may be easily mounted thereon and the usual conventional commercial frame structure which is now generally used will not be necessary. Not only is the engine supported upon a cushion mounting but it is rockably mounted upon its longitudinal axis. Its rocking is not however communicated to the body but these vibrations are taken by the structural connection with the transmission.

At the front end the shock absorbers 22 serve to damp out the shocks of road travel between the wheels and the transmission casing. At the rear end I provide shock absorbers 59 here shown as mounted on the engine supporting frame and connected with the axle 28. Such shock absorbing mechanism might be secured to the engine if desired. It will be observed that these shock absorbers are not connected to the body or its frame. In this manner the reactionary effects of the shock absorbers themselves are not felt within the body of the vehicle.

I provide a body which forms a substantially rigid unit. As shown, it is of the truss type. There are longitudinal side frame members 60, a series of upright frame members 62, and a roof frame member 64. The front frame member 66 extends from this roof frame member to the front axle tubes 14. Rear truss members 68 extend from the rear of the upper truss member 64 to the cross members 32 and 34 outwardly from the corners of the frame assembly which carries the engine. These body frame members are not connected rigidly with the parts which support them but as shown in Fig. 7 there is a cushion or block 70 of rubber or other suitable material which is secured on one face to a bracket carried on the body frame and on the opposite face to the supporting part of the vehicle in a suitable manner which provides a free cushion element disposed between the body frame and the supporting part of the vehicle so that the vehicle body has a full cushion support. The surface of the rubber block 70 is intimately bonded with the connecting sections of the support and body frame and aids in securing the latter to the vehicle.

Because of the disposition of the parts heretofore described the vehicle body may be highly streamlined and to further facilitate this streamlining I prefer to mount the spare tire 72 within the nose of the body concealed by a cover plate 74 which may be secured in place in any suitable fashion such as is here shown. The cover plate forms a portion of the streamlined body itself.

It will also be seen that by virtue of this arrangement the passenger compartment of the body may be located between the engine and the transmission mechanism and between the front and rear wheels so as to provide maximum ease and comfort for the occupants. It will be noted that the rear seat contrary to the construction now used is well forward of the rear axle. The structural member 52 is shown as extending through the lower portion of the body, the floor being elevated therealong. This need not be followed as the connection of the propeller shaft with the transmission mechanism might be of a character which would permit the lowering of the propeller shaft.

It will be noted that there is no conventional frame and yet the entire vehicle consists of a number of independent structural units which can be assembled with ease on the customary assembly lines in automobile manufacturing plants. The primary structural units comprising the vehicle are the supporting wheels, the combined engine and transmission structure forming the back bone of the vehicle, the engine supporting frame, and the truss supported vehicle body; and each of these units in assembled condition is resiliently mounted with respect to the other. When all these units have been assembled together with the exception of the body, the latter in completely painted and upholstered condition can be mounted over the other units as the final assembly.

Various modifications of my device will be apparent to those skilled in the art and for that reason I intend to limit myself only within the scope of the appended claims.

What I claim:

1. A vehicle having a pair of supporting wheels at each end, an engine supporting frame spring supported upon only one pair of wheels, an engine pivotally supported about its longitudinal axis upon said frame, transmission mechanism supported upon the other pair of wheels, and a structural torque taking unit connecting the engine and transmission mechanism into an independent structural assembly.

2. A vehicle having a pair of supporting wheels at each end, an engine supporting frame spring supported upon one pair of wheels, an engine carried upon said frame, transmission mechanism spring supported upon the other pair of wheels, and structural means separate and independent of said frame connecting said engine and transmission mechanism into an independent structural assembly.

3. A vehicle having a pair of supporting wheels at each end, an engine supporting frame spring supported upon one pair of wheels, an engine resiliently supported upon said frame, transmission mechanism supported upon the other pair of wheels, and a structural torque taking member connecting the engine and transmission mechanism to form a structural assembly separate and independent of said frame.

4. A vehicle having a pair of supporting wheels at each end, an engine supporting frame spring supported upon one pair of wheels, an engine mounted upon said frame upon cushion supports for rockable movement about a longitudinal axis, transmission mechanism supported upon the other pair of wheels, and a structural element connecting the engine and transmission mechanism into a unitary assembly.

5. A vehicle having a pair of supporting wheels at each end, an engine supporting frame spring supported upon one pair of wheels, an engine rockably supported upon a resilient mounting upon said frame, a transmission mechanism supported upon the other pair of wheels, and a torque taking structural member connecting the engine with the transmission mechanism into a rigid structural assembly independently of the frame.

6. In a vehicle having a pair of supporting wheels at each end, an engine supporting frame spring supported on one pair of wheels, an engine resiliently carried on said frame, shock absorber mechanism connecting the frame with its supporting wheels, transmission mechanism supported on the other pair of wheels, structural means connecting the engine with the transmission mechanism independently of said frame and a body resiliently attached to the frame.

7. In a vehicle having a pair of supporting wheels at each end, an engine supporting frame spring supported on one pair of wheels, an engine carried on said frame, shock absorber mechanism connecting the frame with its supporting wheels, transmission mechanism spring supported upon the other pair of wheels, shock absorber mechanism connecting the transmission mechanism with its supporting wheels, and structural means connecting the engine with the transmission mechanism into a rigid assembly.

8. A vehicle having a pair of supporting wheels at each end, an engine supporting frame spring supported upon one pair of wheels, an engine resiliently supported upon said frame, transmission mechanism supported upon the other pair of wheels, a structural torque taking member connecting the engine and transmission mechanism to form a rigid assembly separate and independent of said frame, and a body resiliently supported upon said frame at one end and upon the other wheel supported structure at the opposite end.

9. A vehicle having a pair of supporting wheels at each end, an engine supporting frame spring supported upon one pair of wheels, an engine rockably supported upon a resilient mounting upon said frame, transmission mechanism supported upon the other pair of wheels, a torque taking structural member connecting the engine with the transmission mechanism into a rigid structural assembly independently of the frame, and a rigid body supported at one end upon said frame and supported at the opposite end upon said transmission mechanism.

10. A vehicle having a pair of supporting wheels at each end, an engine supporting frame spring supported upon one pair of wheels, an engine carried upon said frame, transmission mechanism spring supported upon the other pair of wheels, structural means separate and independent of said frame connecting said engine and transmission mechanism into a rigid assembly, and a body supported at one end upon said frame and supported at the opposite end upon the other wheel supported structure.

11. A vehicle having a pair of supporting wheels at each end, an engine resiliently supported upon one pair of wheels, transmission mechanism spring supported upon the other pair of wheels, structural means connecting said engine and transmission mechanism into a rigid assembly, and a rigid truss type of body resiliently supported at one end upon the pair of wheels which carry the engine and resiliently supported at the opposite end upon the housing of the transmission mechanism.

12. A vehicle having a pair of front wheels, a pair of rear wheels, an engine supporting frame spring supported on the rear wheels, an engine cradled upon said frame for rockable movement about its longitudinal axis upon cushion supports, transmission mechanism spring supported on the front wheels, a rigid structural torque taking element connecting the engine with the transmission mechanism independently of the frame, shock absorbing mechanism connecting the frame with the rear wheels, shock absorbing mechanism connecting the transmission mechanism with the front wheels, and a body supported at the rear end upon a cushion mounting on said frame, and supported at the front end upon a cushion mounting upon parts associated with the transmission mechanism.

13. In a motor vehicle having a pair of road wheels at each end, an engine supporting frame spring supported upon one pair of road wheels, an engine carried by said frame, a truss type body having upright truss members connected to the two opposite ends of said frame and connected together at the top of the body and means resiliently connecting the body to the other road wheels.

14. A motor vehicle having a pair of road wheels at each end, an engine cushion mounted to a frame resiliently supported upon one pair of road wheels, transmission mechanism supported on the other pair of road wheels, and a torque transmitting element connecting the transmission mechanism with the engine into a rigid assembly to transmit torque reactions from the transmission mechanism to the cushion mounted engine.

15. In a motor vehicle having a pair of supporting wheels at each end, an engine supporting frame spring supported entirely upon one pair of wheels, a rigid structural assembly including an engine unit at one end carried by said frame and a transmission mechanism at the other end carried by the other pair of wheels, said assembly forming a rigid backbone for the vehicle upon which other structure may be supported.

16. A vehicle having a pair of supporting wheels at each end, an engine resiliently supported upon one pair of wheels, transmission mechanism resiliently supported on the other pair of wheels, structural means connecting said engine and transmission into a rigid assembly, a rigid truss type of body, and means for resiliently attaching said body to said rigid assembly.

17. A vehicle having a pair of supporting wheels at each end, a rigid structural assembly including an engine unit at one end and transmission mechanism at the other end resiliently supported on said wheels and extending between said pair of wheels to form a backbone for the vehicle, and a body unit cushion mounted with respect to the structural assembly adjacent the opposite ends thereof.

18. In a motor vehicle having a pair of road wheels at each end, an engine supporting frame resiliently supported upon one pair of road wheels, a rigid structural assembly including an engine unit at one end carried by said frame and a transmission mechanism at the other end supported upon the other pair of road wheels, and a body unit cushion mounted to the engine supporting frame at one pair of road wheels and to the structural assembly at the other pair of road wheels.

19. In a motor vehicle, a pair of road wheels, an engine supporting frame resiliently supported upon said pair of road wheels, an engine resiliently carried by said frame, and a body for said vehicle resiliently mounted to said frame whereby two sets of resilient mountings are interposed between the engine and the body to dampen out vibrations.

CLIFTON R. ROCHE.